Sept. 9, 1941.  M. EWALD  2,255,048
PROCESS FOR CUTTING HALF FRUIT
Original Filed Feb. 15, 1934    2 Sheets-Sheet 1
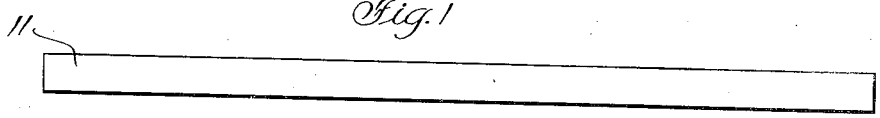
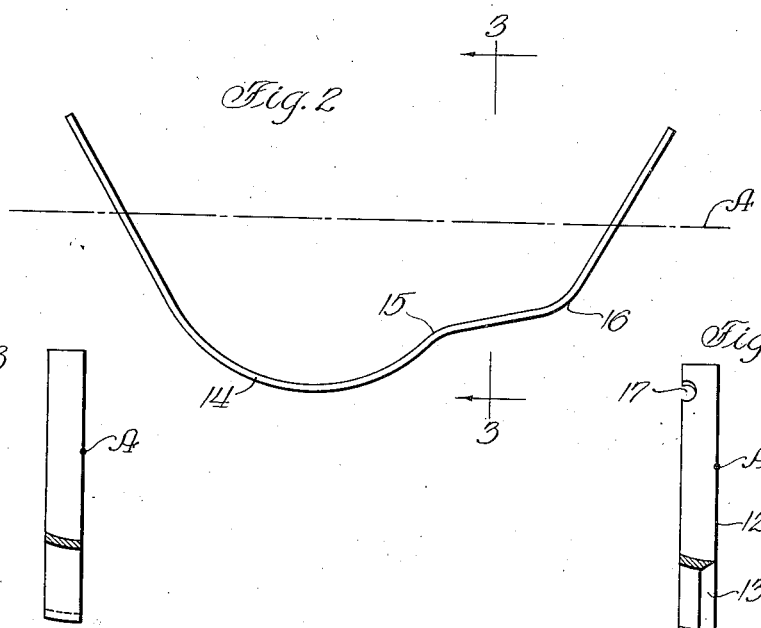
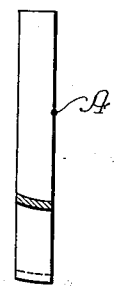
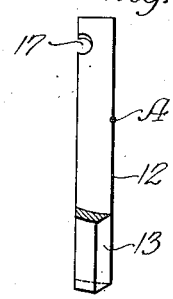
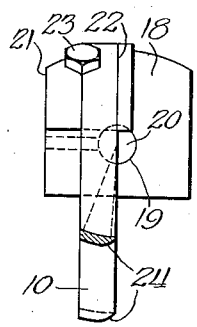
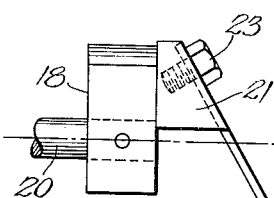
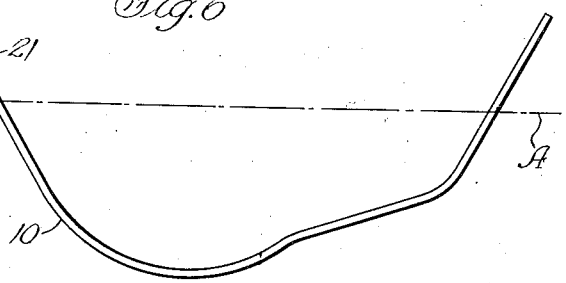
INVENTOR.
Mark Ewald
BY
ATTORNEY.

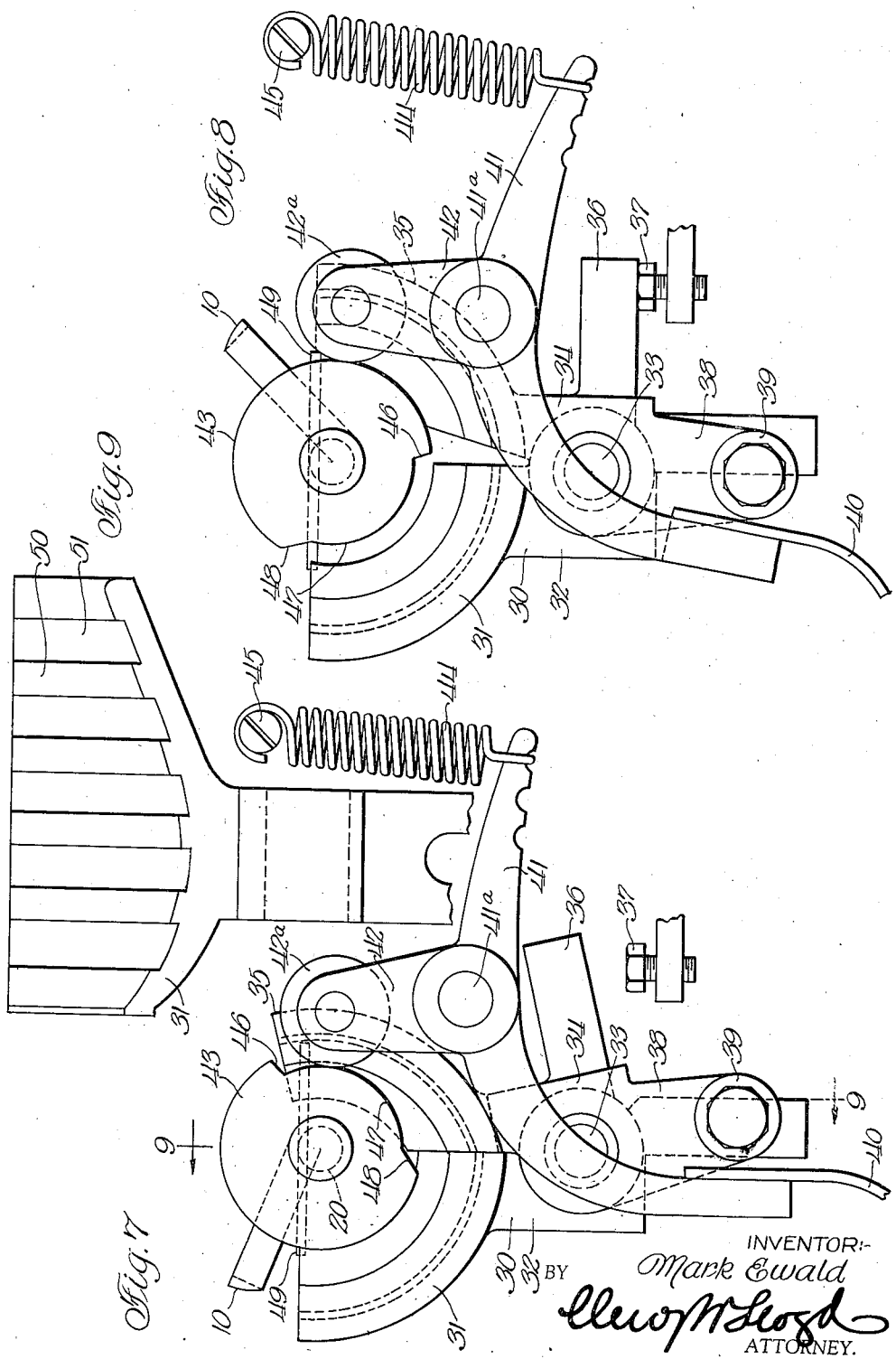

Patented Sept. 9, 1941

2,255,048

UNITED STATES PATENT OFFICE 2,255,048

PROCESS FOR CUTTING HALF FRUIT

Mark Ewald, Olympia, Wash., assignor to Special Equipment Company, Portland, Oreg., a corporation of Oregon Original application February 15, 1934, Serial No. 711,354. Divided and this application October 26, 1934, Serial No. 750,152. Renewed March 27, 1939

32 Claims. (Cl. 146—219)

This invention has to do with a process for cutting half fruit preparatory to canning.

The present process in one of its aspects relates to the formation of a cut through the flesh of a half fruit wherein a predetermined portion of the half fruit is removed and wherein the cutting means during a portion of the cutting movement serves laterally to shift at least a portion of the half fruit whereby to position an uncut portion of the half fruit in proper position for a continuance of the cutting.

In another aspect of the invention the method is concerned with a cutting of half fruit wherein the cutting means is effective during a portion of the cut formed in the flesh of the fruit laterally to move the fruit to position the fruit for a continuance of the formation of the proper cut through the flesh of the half fruit.

In another aspect the method embraces a peeling cut formed in the flesh of a half fruit and wherein a cutting means during a portion of the movement of the cutting means beginning at the cut face of the half fruit and moving in a direction inwardly thereof laterally shifts the half fruit to such a position that a continuance in an arcuate movement of the cutting means properly completes the peeling cut.

Another aspect of the invention resides in the method wherein a peeling cut is formed in a half fruit in such a manner that during the peeling action spaced areas of the peel are held substantially rigidly from movement outwardly of the normal position of the peel, while other intervening spaced areas of the peel are permitted laterally to shift outwardly to accommodate the peeling cutter whereby to accomplish a more perfect peeling.

With regard to the apparatus for carrying out various aspects of the process, the half fruit is held in a suitable fruit holder, herein shown preferably as a fruit holder somewhat cup-shaped substantially to fit the general contour of the half fruit, and wherein the cutting means, herein shown specifically as peeling means and preferably in the form of a knife having a cutting contour comparable to the cross sectional contour of the half fruit to be peeled, if it be a peeling operation is adapted to swing concentrically about a single fixed axis.

For an understanding of a cup in which the knife here described is useful, reference may be had to the co-pending application of Mark Ewald, serially numbered 627,549, filed August 5, 1932, entitled Fruit holding cup, and of which application the present is a continuation in part.

In my prior application 627,549 aforesaid, I have included apparatus claims comparable with the process claims of the present application.

A complete knowledge of the machine with which the present invention is adapted to be combined may be had by referring to a co-pending application of Mark Ewald, serially numbered 636,447, filed October 6, 1932, and entitled Fruit treating apparatus.

The present application for Letters Patent is a division of an application in the name of Mark Ewald, serially numbered 711,354, filed February 15, 1934, and entitled Process of knife manufacture.

Reference is made also to an application in the name of Mark Ewald, serially numbered 750,151, filed October 26, 1934, and entitled Peeling knife, which application is also a division of the above identified application, serially numbered 711,354.

Among the objects of the present invention is the provision of:

An improved process of peeling fruit including half portions or other sections of fruit wherein the fruit is supported upon its peel at spaced apart zones or areas and preferably compressed thereagainst and wherein while so compressed the peel is severed from the fruit in such a manner as to cause the severed peel to be forced radially outwardly in the spaces between the supporting areas whereby while confining the curved surfaces of the fruit between non-yielding areas and passing the peeling knife through the body of the fruit, certain portions of the peel may be displaced outwardly to compensate for the area of the peeling blade whereby to effect more perfect peeling.

These objects and such other objects as may hereinafter appear are obtained by the novel construction, unique arrangement, and improved combination of elements illustrated in the accompanying two sheets of drawings, hereby made a part of this application, and in which:

Figure 1 is a plan view of a blank of metal from which the improved knife may be made;

Figure 2 is a side view of the blank of Figure 1 subsequent to it being distorted to approximate the shape of the finished article;

Figure 3 is a transverse sectional view of the unfinished knife taken at the line 3—3 of Figure 2;

Figure 4 is a view similar to Figure 3 but after a partial sharpening of the knife;

Figure 5 is a fragmentary view of the finished knife, showing the manner of attachment to means for its rotation;

Figure 6 is a left side view of the parts shown in Figure 5;

Figures 7 and 8 are elevations of a closed and open position, respectively, of a fruit holding cup illustrating the manner in which the knife coacts therewith in the peeling of a fruit; and Figure 9 is a side view of one of the cup elements taken at the line 9—9 of Figure 7.

Like reference characters are used to designate similar parts in the drawings and in the description of the invention which follows.

I have illustrated one of the aspects of the present process in connection with a process for peeling half fruit wherein a knife of particular configuration and structure is utilized.

The blank from which blade 10 is made is shown at the initial stage of its manufacture in Figure 1. Such blank is in the form of a long rather narrow strip 11 of suitable metal. The thickness of the strip 11 depends upon its length and the size desired in the finished article. At present knives like the one illustrated are made in four sizes, the material being stainless cutlery steel. In the smallest size of knife, the steel strip 11 generally is .042 of an inch in thickness. In the largest of the four sizes of knives, the metal strip 11 generally has an original thickness of .065 of an inch.

After the strip 11 has been obtained, as by shearing or stamping it from a larger piece of sheet material, the strip is subjected to the action of complemental swaging tools whereby it is deformed longitudinally into the shape illustrated in Figure 2. In addition to the longitudinal curvature given to the blade, shown in Figure 2, the blank is given a slight curve transversely of its body, as shown in Figure 3. In Figures 2, 3 and 4, the axis of rotation of the blade, when it is finished, is indicated by a broken line and dot designated by the character "A." The axis coincides substantially with an edge of the blade, such edge being the cutting edge. The transverse curvature of the blade is such that the body of the blade at all points save the outer face of the cutting edge substantially focuses upon the axis A. Such is true for the whole length of that section of the blade lying to one side of the axis of rotation.

Figure 4 is a view similar to Figure 3 but illustrates the unfinished blade after it has been partly ground (13) along its leading edge 12. In forming the section 13, which is coextensive with sections 14, 15 and 16 of the blade, about two-thirds the thickness of the material is removed at the lower part of the leading edge 12, the face 13 extending backwardly about one-third of the width of the blade. At this time notches 17 may be formed at opposite ends of the blade to facilitate attachment to blocks 18 for rotation, one block being shown in Figures 5 and 6.

The notches 17 are so placed that the axis "A" of the blade will coincide with the center of a shaft opening 19 in each of the blocks 18, such openings receiving shafts 20 for rotating the blocks 18.

After the face 13 and the notches 17 have been formed in the blank, the blade is subjected to a suitable heat treatment for tempering. A satisfactory heat treating process has been found to include the steps of heating the blade to 1725° Fahrenheit, then quenching in oil and leaving the article in oil of 400° Fahrenheit for a short period of time. This being done, the knife is placed in a suitable device, not shown, for oscillating it about axis A while a small grinding member is moved back and forth along its inner face. In this manner, the inner face of the blade is given a surface which at all points focuses truly upon the axis A of rotation.

Next, the face of the outer section 13 of the blade is rounded as shown in Figure 5 adjacent the leading edge 12 thereof so that the outer face converges upon the inner face and forms a cutting edge, the cutting edge being substantially flush with the inner face. Figure 5 illustrates a cross section of a finished blade intermediate its length.

Figure 6 is a side view of one of the blocks 18 to which the blade 10 is attached for rotation. The block 18 receives a rotating shaft 20 in its shaft opening 19. Any suitable fastening means, as a pin, may be used therebetween. A lug 21 projecting from the block has an inclined face traversed by a groove 22 into which groove the end of the blade beyond its cutting edge may be seated. A cap screw 23 passing through the notch 17 detachably holds the blade in place upon the block 18. The other end of the blade 10 may be similarly attached to a complemental block 18, not shown.

By shaping the inner face of the blade 10 about the axis of rotation A, the knife when passed through the body of a fruit, will glide freely along the periphery of the portion of the fruit from which the peel has been severed, the body of the knife not crowding or distorting the body of the fruit from which the peel is separated. The trailing section of the face of the blade will be at the same radius from the axis of rotation of the blade as the leading and cutting edge portion and hence there will be no tendency for the body portion to squeeze or bruise the useful section of fruit. The radius at which the outer face of the knife swings or rotates is such as to carry that face a small fraction of an inch from the inner wall of the cup that holds the fruit, see Figure 7.

Figures 7, 8 and 9 illustrate a fruit holding cup 30 with which the peeling blade 10 may be used. The cup 30 consists of a stationary wall 31 having a stem 32 depending therefrom for the support of the cup. Hingedly attached to the stem 32 at 33 is the stem 34 of a wall member 35 complemental to the first wall. Projecting from the stem 34 is a lug 36 for abutting against a stop member 37 during certain stages of operation of the machine to limit the separation of the cup walls. This is illustrated in Figure 8. Normally the movable cup wall 35 rests in the position shown in Figure 8.

Upon a short arm 38 at the lower end of the stem 34 is a roller 39 adapted to be engaged by a resilient finger 40 depending from a pivoted lever 41. The lever 41 is fixed to a shaft 41a as is an arm 42. At the end of the arm 42 is a roller 42a for engaging the periphery of a cam 43 attached to a shaft 20 of the peeling blade for rotation therewith. Engaging an end of the lever 41 is a contraction spring 44 having an end anchored at 45. At all times during the rotation of the blade 10 and the cam 43 the roller 42a is pressed against the periphery of the cam by means of the force exerted by the spring 44.

Within the periphery of the cam 43 is a notch 46 at one side of a depressed section 47 and an incline 48 at the other side of the depressed section. Associated with the blade 10 is a pad 49 for engaging the flat face of a half fruit held within the cup 30.

Means (not shown) is provided for lowering the blade 10, pad 49, the cam 43 and shaft 41a and its appendages while the knife is in the position shown in Figure 7. As the peeling mechanism is lowered, the finger 40 rides along the roller 39 to pivot the movable wall 35 toward the wall 31 to compress the fruit between the cup wall elements. At this time the roller 42a registers with the depressed section 47.

As the blade 10 and cam 43 are rotated in an anticlockwise direction the roller 39 is pressed by the finger 40 to keep the wall elements together until the blade 10 reaches a position substantially at the bottom of the cup at which time the incline 48 of cam 43 passes beneath the roller 42a to pivot the arm 42, shaft 41a and the lever 41 in a clockwise direction to release the engagement of finger 40 with the roller 39. The wall 35 will then be free to pivot and fall by its own weight away from stationary wall 31. As the knife traverses the second of the cup segments that segment is moved thereby to the position shown in Figure 8. The interior of cup wall segment 35 forms a true arc about the axis of the rotating knife when separated from the wall segment 31, this can be seen by examining and comparing Figures 7 and 8.

Concurrently with the movement of the knife through a half fruit there is caused an outward pressure of the knife upon a thin section of the fruit including the peel. The beveled face 24 of the knife as it travels separates more of such thin section and presses against such severed section first to the extent of its penetration into the fruit and thereafter to the extent of the breadth of the blade. Because the bevel of the blade is upon its outer face, the pressure upon the peel and the pull upon the body of the fruit is directed outwardly of the fruit and against the wall of the cup at and just ahead of the cutting edge of the knife. The pressure of the blade of the cutting means upon the fruit is sufficient to displace the half fruit laterally, the movable cup section having already fallen to concentric open position shown in Figure 8 after the finger 40 has been displaced from the roller 39.

The extent of the pull upon the fruit by the narrow ligature of the peel against section 24 of the blade may be regulated by changing the bluntness of such section with respect to the cutting edge. By increasing the angle between section 24 and the inner face of the blade, the bluntness is increased; correspondingly, the pull upon the fruit through that short ligature of peel cut therefrom and reaching between the fruit and the section 24 is increased. Such pulling upon the fruit peel tends to keep the fruit in firm contact with the wall of the fruit receptacle in the area just ahead of the advancing knife. Care must be taken, however, not to make the angle between the section 24 and the inner face of the blade too obtuse for a great obtuseness may cause the knife to dip too deeply into the fruit.

Preferably the interior of the cup is provided with a series of ribs 50 separated by grooves 51 (Figure 9). When a fruit is peeled in a cup having a smooth inner surface there may be a tendency for the narrow ligature of the severed section of the fruit just back of the advancing edge of the knife and opposite to the beveled portion adjacent to the knife edge to pile and to creep with the main body of the knife. The severed material may bunch and thus impair the cutting operation of the knife by distorting the knife. Such compacting of the fruit tends to disturb the regular path which the knife would otherwise take in respect to the adjacent inner periphery of the cup. Chattering of the knife may be produced, leaving an uneven surface upon the peeled product. Any irregularity in the welt of fruit material moving ahead of the knife tends to cause an irregular path of the latter through the fruit.

This effect is wholly obviated by the use of a ribbed cup as shown. There is ample room within the spaces between the ribs of the cup for the thin layer of separated fruit peel to be displaced radially of the axis of rotation of the blade so that there is no tendency for the severed layer to move with the knife. The tendency of peeled off sections of the fruit to resist movement of the knife is reduced inasmuch as the grooves between the ribs provide areas upon the fruit free from pressure and into which the severed material may be deflected in part by the increased pressure produced by the knife over the supported areas of the fruit.

The width of the supporting area of the ribs 50, within certain limits, is not of paramount importance. It is more important that the interior of the cup be properly apportioned to fruit supporting surface upon the ribs and to space between the ribs so that there will be sufficient room for displacement of the removed peripheral layer whether the interior is divided up into a great number of relatively narrow fruit supporting surfaces spaced closely, or whether the interior consists of relatively wide support areas separated by correspondingly wide grooves. In the drawings the fruit receptacle 30 is shown to have grooves of slightly greater width than the area of support upon the ribs.

What is claimed as new and is desired to be secured by Letters Patent of the United States is:

1. That method of peeling a fruit and which comprises the steps of supporting such fruit at spaced apart areas upon its peel upon relatively unyielding surfaces, and severing a thin peripheral layer including the peel from such held fruit while dressing the peel at the zone of cutting outwardly against the relatively unyielding surfaces while displacing a portion of such layer into the spaces between such areas of support.

2. That method of peeling a fruit that comprises the steps of supporting a fruit section having a plane face subtending a surface of peel thereon at spaced apart areas upon its peel, applying pressure upon such plane surface and upon spaced-apart areas of such peel to compress said fruit section, and severing a peripheral layer including such peel from the compressed fruit section while displacing a portion of such layer transversely of such areas of support into the spaces therebetween.

3. The method of peeling a fruit that comprises the steps of supporting a fruit section having a plane face subtending a surface of peel thereon at spaced apart areas upon its peel, compressing said fruit section by applying pressure upon said plane face and upon spaced-apart sections of said peel, and severing the peel from the body of said fruit section by a single continuous operation while applying such pressure.

4. The herein described method of peeling a half fruit that comprises the successive steps of supporting such fruit at selectively spaced apart areas upon its peel, compressing such fruit at such areas by applying pressure upon the flat face thereof, and severing a thin peripheral layer including the peel from such held fruit while displacing a portion of such layer into the spaces between such areas of support.

5. The herein described method of peeling a half fruit that comprises the steps of supporting such fruit upon parallel spaced apart areas only of its peel, compressing such fruit at such sections of support, and severing the peel from such fruit while so compressed.

6. The herein described method of peeling a half fruit that comprises supporting such fruit upon substantially parallel areas spaced at a distance substantially equal to their width, applying pressure upon the flat face of such fruit thereby causing compression thereof upon such areas of support, severing the peel while so compressed from such fruit while displacing a portion of such fruit into the spaces between such areas of support.

7. The herein described process of peeling fruit comprising rigidly maintaining an unpeeled fruit between confining surfaces while passing a peeling knife through the fruit to peel the same and causing spaced apart areas of the peel to shift outwardly of the fruit, the combined area of displacement of said outwardly shifting peel areas substantially equalling the cross-sectional area of the peeling knife passing through the fruit.

8. The herein described method of peeling half fruit which comprises maintaining and confining the peel of the fruit at spaced portions only thereof coextensive with the substantially entire superficial area of the peel to be severed from shifting movement radially outwardly of the fruit, severing the peel from the fruit and at the same time permitting those portions of the severed peel disposed between the portions of the peel confined from outward movement, to shift radially outwardly of the surface of the fruit.

9. The herein described method of peeling half fruit which comprises rigidly confining alternately disposed zones only of the peeling to be severed from movement radially outwardly of the half fruit, severing the peel therefrom by passing a peeling blade therethrough adjacent the peel while permitting those portions of the peel between the alternately confined portions to shift radially outwardly of the fruit.

10. The herein described method of peeling half fruit which comprises supporting the half fruit in a substantial cup-shaped member, the inner walls of which are provided with a plurality of alternately disposed, spaced-apart rigid surfaces adapted to contact the peel of the fruit, there being spaces between the supporting surfaces, the proportion of the supporting surfaces to the spaces therebetween being sufficient to provide room for displacement of the removed peel when severed by a peeling knife, and passing an arcuate peeling knife through the flesh of the fruit just within the junction of the peel and the flesh whereby to cause the outward displacement of those portions of the peel lying between the spaced-apart rigid supports.

11. The herein described method of peeling fruit which comprises rigidly confining an unpeeled fruit with its peel contacting spaced, non-yielding surfaces substantially throughout the area of the peel to be severed, severing the peel from the fruit by passing a peeling blade through the fruit closely adjacent the peel while permitting certain portions of the severed peel to shift lateraly outwardly of the surface of the fruit into spaces between the non-yielding surfaces, the non-yielding surfaces maintaining the supported portions of the severed peel from shifting laterally outwardly.

12. The herein described method of peeling a half fruit comprising supporting such fruit upon spaced apart areas only of its peel, compressing such fruit at such sections of support, and severing the peel from such fruit while so compressed.

13. The method of cutting half fruit which includes moving cutting means to form a cut in the flesh of a half fruit, and causing the cutting means laterally to shift the half fruit to position an uncut portion thereof into proper position to be cut by continued cutting movement thereof through the flesh of said half fruit.

14. The method of peeling half fruit which includes moving peeling cutting means through the flesh of the half fruit, and causing such movement to shift the flesh of said half fruit laterally and continuing the peeling movement of said cutting means.

15. The method of cutting a half fruit comprising moving cutting means through a portion of the flesh of said half fruit and causing a portion of said cutting movement laterally to shift the half fruit to position an uncut portion of the flesh of the half fruit for further cutting, and pressing on the cut face of the half fruit during at least a portion of the cutting movement.

16. The method of cutting a half fruit comprising moving cutting means through the flesh of half fruit to form a predetermined cut therein, said cut extending both inwardly and laterally of the flesh of the half fruit, causing the lateral movement of the cutting means laterally to shift the half fruit to position uncut portions thereof for further cutting and pressing on the cut face of the half fruit during a portion of the cutting movement.

17. The method of peeling half fruit comprising forming a continuous, arcuate cut through the flesh of a half fruit immediately beneath the peeling thereof, said cut being formed about a single axis and beginning at the cut face of the half fruit and moving arcuately inwardly of the half fruit and thence outwardly of the half fruit and terminating at the cut face thereof, that portion of the path of peeling cut made from the cut face inwardly and substantially to the point of maximum radius from said single axis being formed while passing laterally against the opposite periphery of the half fruit to press the peel overlying the cut being made, against non-yieldable wall portions having a concavity shaped substantially parallel to the direction of the line of cut being made, thereafter releasing such lateral pressure, and causing the half fruit bodily to shift laterally against opposite unyieldable wall portions disposed concentric to said first mentioned concave wall portions, while continuing said concentrically arcuate line of cut outwardly of the half fruit.

18. The method of peeling half fruit comprising forming a continuous, arcuate cut through the flesh of a half fruit immediately beneath the peeling thereof, said cut being formed about a single axis and beginning at the cut face of the half fruit and moving arcuately inwardly of the half fruit and thence outwardly of the half fruit and terminating at the cut face thereof, that portion of the path of peeling cut made from the cut face inwardly and substantially to the point of maximum radius from said single axis being formed while pressing laterally against the opposite periphery of the half fruit to press the peel overlying the cut being made against non-yieldable wall portions having a concavity shaped substantially parallel to the direction of the line of cut being made, thereafter releasing such lateral pressure, and causing the half fruit bodily to shift laterally against opposite unyieldable wall portions disposed concentric to said first mentioned concave wall portions, while continuing said concentrically arcuate line of cut outwardly of the half fruit, and while urging said half fruit against said second mentioned concave wall.

19. The method of peeling half fruit comprising forming a continuous, arcuate cut through the flesh of a half fruit immediately beneath the peeling thereof, said cut being formed about a single axis and beginning at the cut face of the half fruit and moving arcuately inwardly of the half fruit and thence outwardly of the half fruit and terminating at the cut face thereof, that portion of the path of peeling cut made from the cut face inwardly and substantially to the point of maximum radius from said single axis being formed while pressing laterally against the opposite periphery of the half fruit to press the peel overlying the cut being made against non-yieldable wall portions having a concavity shaped substantially parallel to the direction of the line of cut being made, thereafter releasing such lateral pressure, and causing the half fruit bodily to shift laterally against opposite unyieldable wall portions disposed concentric to said first mentioned concave wall portions, while continuing said concentrically arcuate line of cut outwardly of the half fruit, said line of peeling cut being formed while also maintaining pressure against the cut face of the half fruit.

20. The method of peeling half fruit comprising forming a continuous, arcuate cut through the flesh of a half fruit immediately beneath the peeling thereof, said cut being formed about a single axis and beginning at the cut face of the half fruit and moving arcuately inwardly of the half fruit and thence outwardly of the half fruit and terminating at the cut face thereof, that portion of the path of peeling cut made from the cut face inwardly and substantially to the point of maximum radius from said single axis being formed while pressing laterally against the opposite periphery of the half fruit to press the peel overlying the cut being made against non-yieldable wall portions having a concavity shaped substantially parallel to the direction of the line of cut being made, thereafter releasing such lateral pressure, and causing the half fruit bodily to shift laterally against opposite unyieldable wall portions disposed concentric to said first mentioned concave wall portions, while continuing said concentrically arcuate line of cut outwardly of the half fruit, said fruit being urged against said last mentioned concave wall portions by means of the outwardly arcuate direction of movement of the cutting means forming such portion of the line of cut.

21. The method of peeling half fruit comprising forming a continuous arcuate cut through the flesh of a half fruit immediately beneath the peeling thereof, said cut being formed about a single axis and beginning at the cut face of the half fruit and moving arcuately inwardly of the half fruit and thence outwardly of the half fruit and terminating at the cut face thereof, that portion of the path of peeling cut made from the cut face inwardly and substantially to the point of maximum radius from said single axis being formed while pressing laterally against the opposite periphery of the half fruit to press the peel overlying the cut being made against non-yieldable wall portions having a concavity shaped substantially parallel to the direction of the line of cut being made, thereafter releasing such lateral pressure, and causing the half fruit bodily to shift laterally against opposite unyieldable wall portions disposed concentric to said first mentioned concave wall portions, while continuing said concentrically arcuate line of cut outwardly of the half fruit and while urging said half fruit against said second mentioned concave wall, said line of peeling cut being formed while also maintaining pressure against the cut face of the half fruit.

22. The method of severing a predetermined section from the flesh of a half fruit which comprises moving cutting means through a portion of the half fruit and so supporting the fruit that the cutting means will shift an uncut portion of the half fruit bodily to position such uncut portion in predetermined relation to the axis of movement of the cutting means, and moving said cutting means through said uncut portion of the half fruit whereby to sever a section of predetermined shape from the flesh of the half fruit.

23. The method of severing a predetermined section from the flesh of a half fruit which comprises moving cutting means through a portion of the half fruit, so supporting the fruit that the cutting means will support the half fruit bodily to position the remaining portion of the half fruit in predetermined relation to the axis of rotation of the cutting means, and then moving said cutting means through said remaining portion of the half fruit whereby to sever a section of predetermined shape from the flesh of the half fruit.

24. The method of treating half fruit comprising forming an arcuate line of cut through the flesh of a half fruit concentrically about a single axis by means of a cutter having a substantially blunt angled outer face, said cut being formed by starting at the cut face of the half fruit and passing inwardly arcuately through the flesh and thence outwardly and ending at the cut face of the half fruit, pressing that periphery of the half fruit overlying the inwardly formed portion of the cut laterally against unyielding concave wall portions lying substantially parallel to the line of cut and while such portion of the line of cut is being formed, and releasing said lateral pressure substantially at the termination of the inward directional movement portion of the line of cut and whereby causing the angled outer wall of said cutter laterally to shift said half fruit against concentrically disposed wall portions disposed opposite said first mentioned wall portions and substantially lying parallel to the last mentioned portion of the line of cut being formed while at least a portion of that portion of said cut formed outwardly in direction is being made.

25. The method of cutting half fruit comprising forming a continuous arcuate cut through the flesh of the half fruit about a single axis by beginning the cut at the cut face, moving the cutter inwardly and thence outwardly and terminating the cut at the cut face of the half fruit meanwhile laterally pressing that half of the periphery of the half fruit circumscribing said inwardly formed portion of the cut against unyielding concave wall portions extending substantially parallel to such portion of the line of cut, thereafter releasing such lateral pressure while maintaining pressure on the cut face and shifting said half fruit laterally into contact with oppositely disposed concentrically arranged concave wall portions lying substantially parallel to that portion of the line of cut that is formed outwardly in direction, and forming said outwardly directed portion of said line of cut, the lateral thrust component of the cutting means while moving arcuately laterally and thence outwardly in direction serving to position said half fruit against said second mentioned concave wall portions.

26. The method of cutting fruit which includes supporting the fruit to be cut, moving cutting means initially through the flesh of the fruit in a predetermined direction to form a cut therein, and then changing the direction of travel of the cutting means as it passes through the flesh of the fruit to a direction laterally of the direction of the first cut in a manner to cause the cutting means to shift the supported fruit from its first mentioned position whereby to position an uncut portion of the fruit into proper position to be further cut by the continued movement of said cutting means as it moves in its lateral travel through the flesh of the fruit.

27. The method of cutting fruit which comprises supporting the fruit to be cut, forming a cut through the fruit in a predetermined direction, altering the direction of travel of the cutting means, moving the fruit to a new position at a speed of movement substantially equal to the speed of movement of the cutting means, stopping further movement of the fruit, and continuing the cut through the fruit in the altered direction.

28. The method of cutting fruit comprising forming an arcuate cut through the flesh of the fruit, supporting the fruit to permit the lateral component of said arcuate cutting movement to shift the fruit laterally, and thereafter stationarily supporting the fruit in its shifted position while continuing said arcuate cut through the flesh of the fruit.

29. The method of cutting fruit comprising forming a line of cut through the flesh of the fruit, altering the line of direction of the cut to cause a lateral thrust on the fruit to shift it to a new position, supporting the fruit in the new position, and meanwhile continuing said line of cut.

30. The method of cutting fruit comprising moving the cutting means to cut through the flesh of the fruit while without stopping the movement of the cutting means, causing such cutting means to move the fruit to a new position, stationarily supporting the fruit in such position, and continuing the cut including a cut formed in a direction generally reversely disposed to the direction of said first formed cut.

31. The method of cutting a section of predetermined shape from a fruit which comprises moving the fruit and cutting means relatively along a given path to cause the cutting means to sever a portion from the fruit and causing the cutting means to shift an uncut portion of the fruit in advance of the cutting means laterally of said path of relative movement into predetermined relation with said path.

32. The method of cutting a section of a predetermined shape from a fruit which comprises moving the fruit and cutting means relatively on a given axis to sever from the fruit a portion concentric to the axis of relative movement, and causing the cutting means to shift an uncut portion of the fruit in advance of the cutting means laterally of said axis of movement into concentricity with said axis.

MARK EWALD.

CERTIFICATE OF CORRECTION.

Patent No. 2,255,048.      September 9, 1941.

MARK EWALD.

It is hereby certified that error appears in the printed specification of the above numbered patent requiring correction as follows: Page 3, second column, line 47, claim 1, for the word "dressing" read --pressing--; page 4, second column, line 55, claim 17, for "passing" read --pressing--; and that the said Letters Patent should be read with this correction therein that the same may conform to the record of the case in the Patent Office.

Signed and sealed this 11th day of November, A. D. 1941.

(Seal)

Henry Van Arsdale,
Acting Commissioner of Patents.